June 7, 1949.  J. BRISKIN  2,472,143

SELF-THREADING DEVICE FOR MOTION-PICTURE APPARATUS

Filed March 10, 1947  7 Sheets-Sheet 1

Inventor:
Jack Briskin
By Zabel & Gritzbaugh
Attorneys

June 7, 1949.　　　　J. BRISKIN　　　　2,472,143
SELF-THREADING DEVICE FOR MOTION-PICTURE APPARATUS
Filed March 10, 1947　　　　　　　　　　7 Sheets-Sheet 4
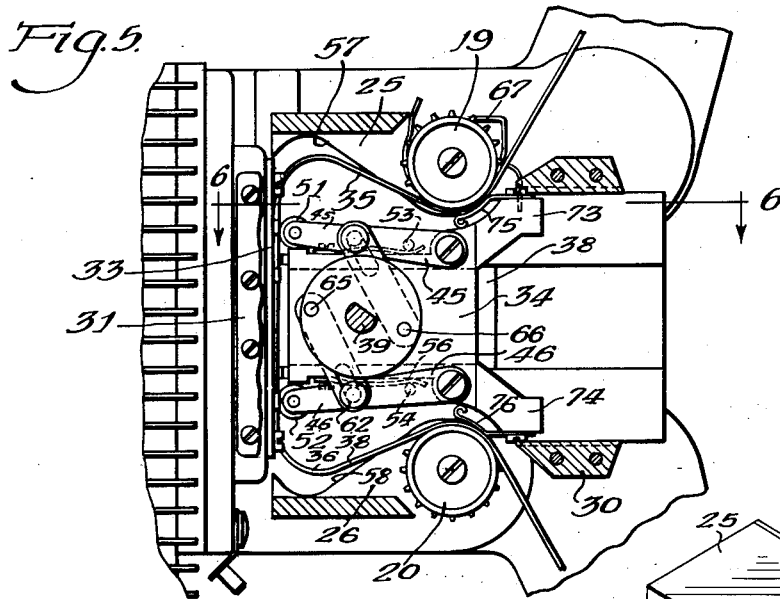
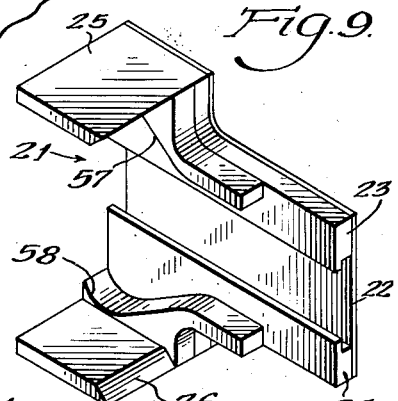
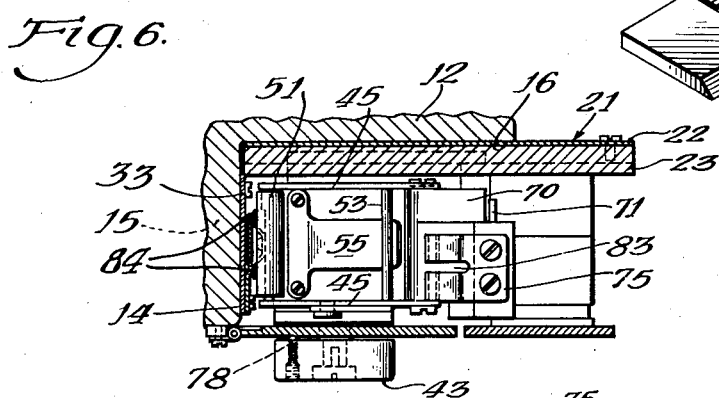
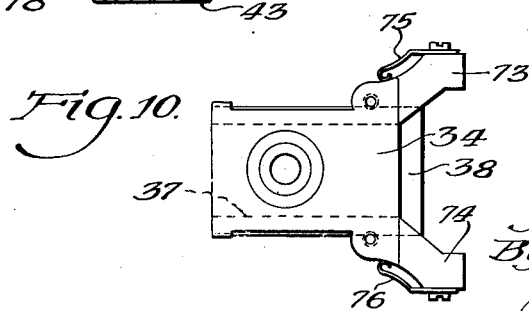
Inventor:
Jack Briskin
By
Zabel & Hutzbaugh
Attorneys June 7, 1949.  J. BRISKIN  2,472,143
SELF-THREADING DEVICE FOR MOTION-PICTURE APPARATUS
Filed March 10, 1947  7 Sheets-Sheet 5

Inventor:
Jack Briskin
By: Zabel & Fritzbaugh
Attorneys

June 7, 1949.    J. BRISKIN    2,472,143
SELF-THREADING DEVICE FOR MOTION-PICTURE APPARATUS
Filed March 10, 1947    7 Sheets—Sheet 6

Inventor:
Jack Briskin
By Zabel & Gritzbaugh
Attorneys.

June 7, 1949. J. BRISKIN 2,472,143
SELF-THREADING DEVICE FOR MOTION-PICTURE APPARATUS
Filed March 10, 1947 7 Sheets—Sheet 7

Inventor:
Jack Briskin
By: Zabel & Gutzbaugh
Attorneys

Patented June 7, 1949

2,472,143

UNITED STATES PATENT OFFICE 2,472,143

SELF-THREADING DEVICE FOR MOTION-PICTURE APPARATUS

Jack Briskin, Chicago, Ill., assignor to Revere Camera Company, Chicago, Ill., a corporation of Delaware Application March 10, 1947, Serial No. 733,638

11 Claims. (Cl. 88—17)

1

This invention relates to a self threading device for motion picture apparatus.

In motion picture apparatus, such as a projector or a camera, means are provided for guiding a film past an apertured member so that a light beam may be projected through or on the film, in combination with means for intermittently advancing the film past said apertured member. Due to the fact that the film is fed to or withdrawn from said intermittent film advancing means by a continuously rotating means, such as a film sprocket, a path is provided for the film which includes one or more loops. Thus, sufficient slack is provided to insure proper operation of said intermittent film advancing means.

In inserting a film in such an apparatus, it is necessary to thread the film past the apertured member and around one or more sprocket wheels, and care must be taken to provide the necessary film loop. In the past, this threading operation has been a manual operation which is time consuming.

It is a primary object of this invention to provide a self threading device which avoids the aforesaid manual operation.

It is a further object of this invention to provide an improved film feeding arrangement embodying loop forming means.

Another object of this invention is to provide in a motion picture apparatus, means for automatically causing registration of the film apertures with the teeth of the sprocket wheel.

Still another object is to provide in a film projector improved means for guiding and feeding the film across a light beam for the projection thereof.

A still further object is to provide in a film projector, an improved film guiding and feeding means which eliminates the usual film gate and which thereby permits the projection lens to be positioned closer to the film, thereby permitting the use of a shorter focal length lens in order to provide a larger projected image at a given projection range than is usually secured by the ordinary construction.

Other objects, features and advantages will become apparent as the description proceeds.

With reference now to the drawings, in which like reference numerals designate like parts—

Figure 3:
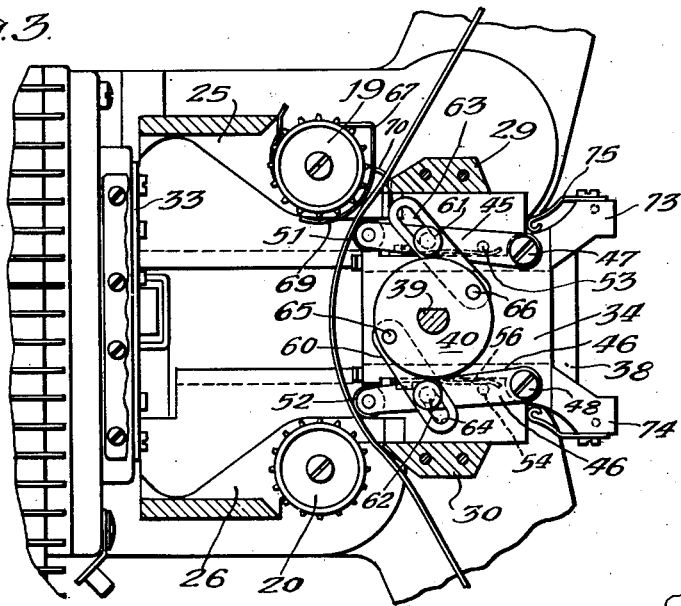
Figure 4:
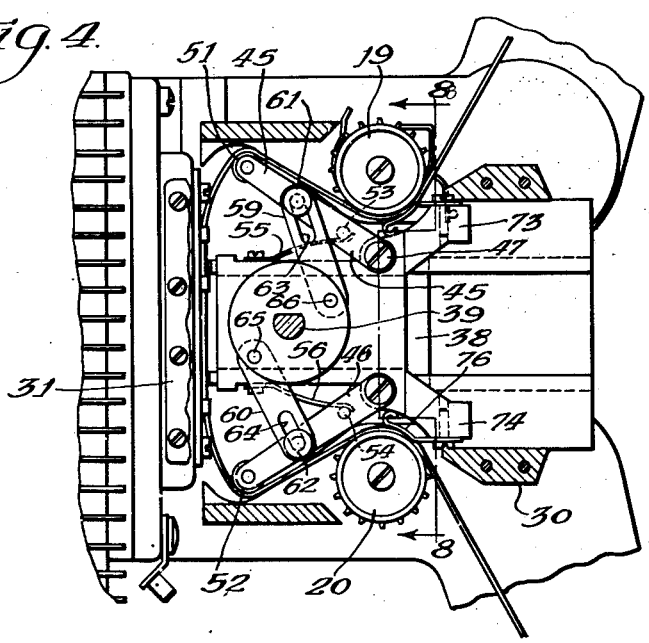

Figs. 3 to 5, inclusive, are enlarged sectional views of the film threading device shown in Figs.

2

Figure 1:
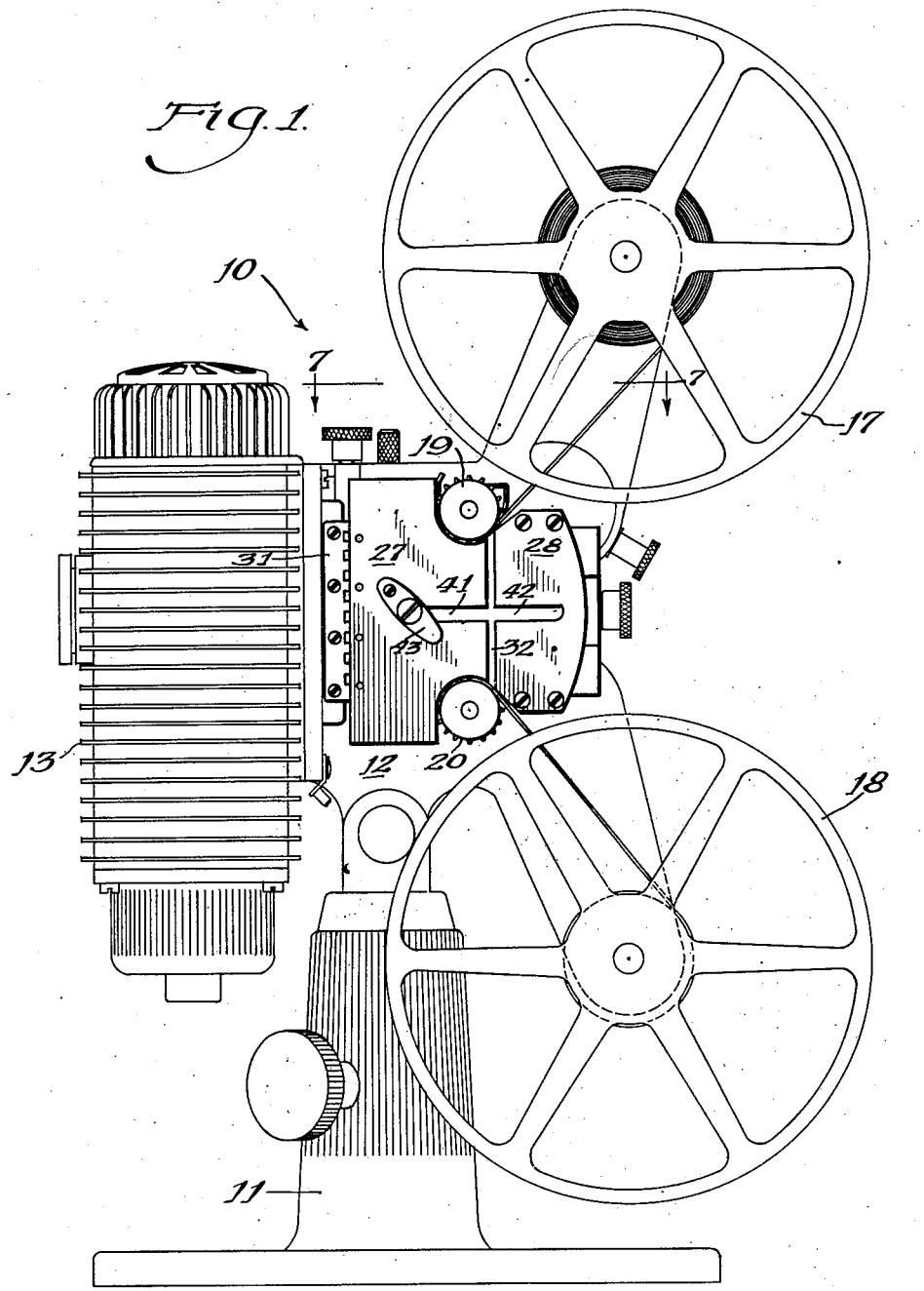
Fig. 1 is an elevation of a motion picture projector embodying a preferred embodiment of this invention.
Figure 2:
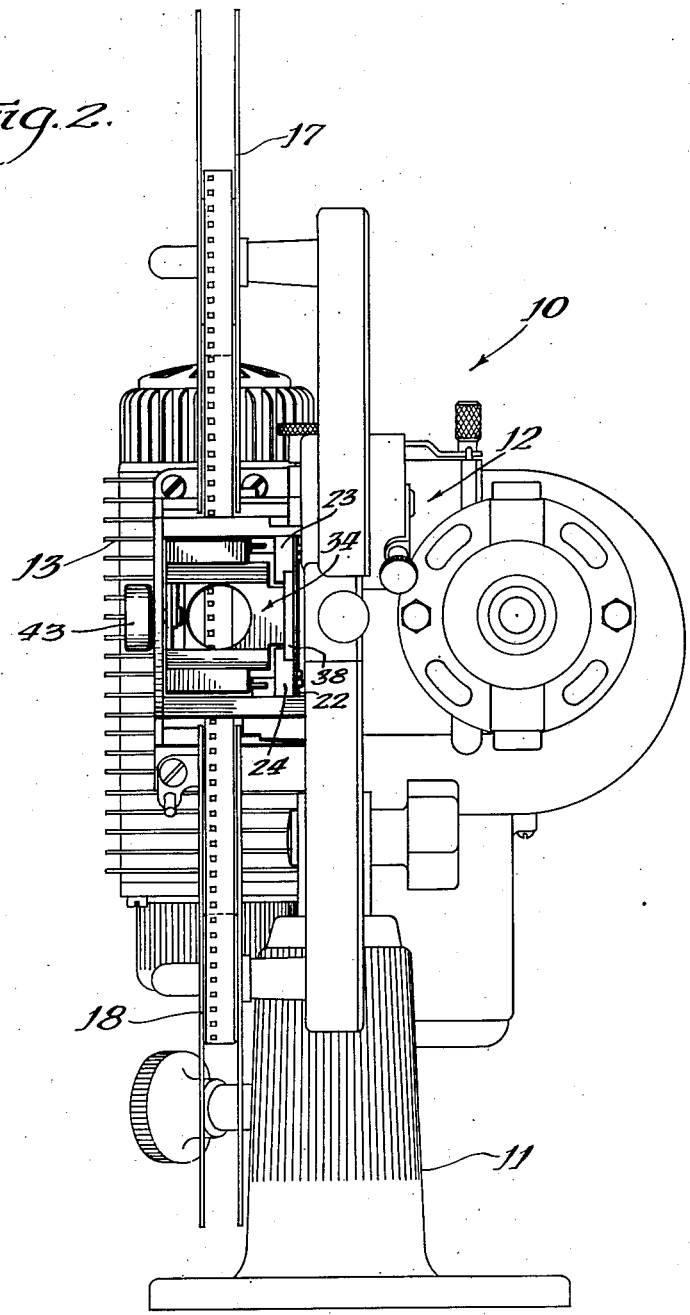
Fig. 2 is a front view thereof.
Figure 7:
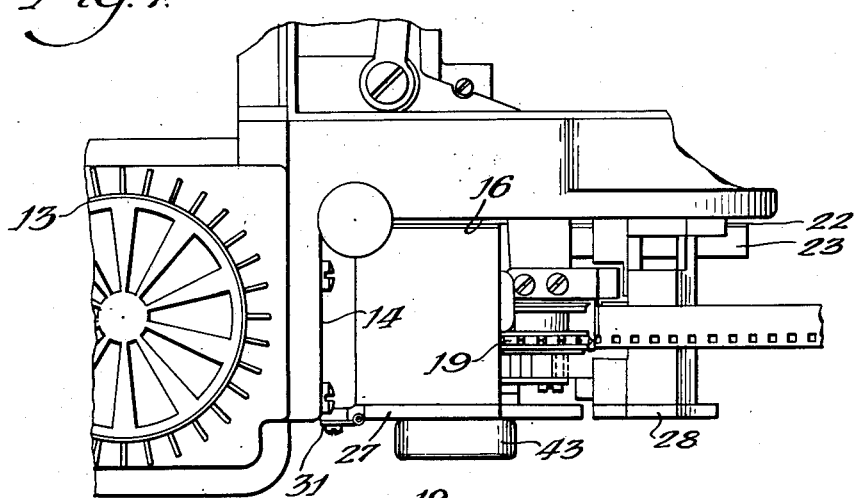
Figure 8:
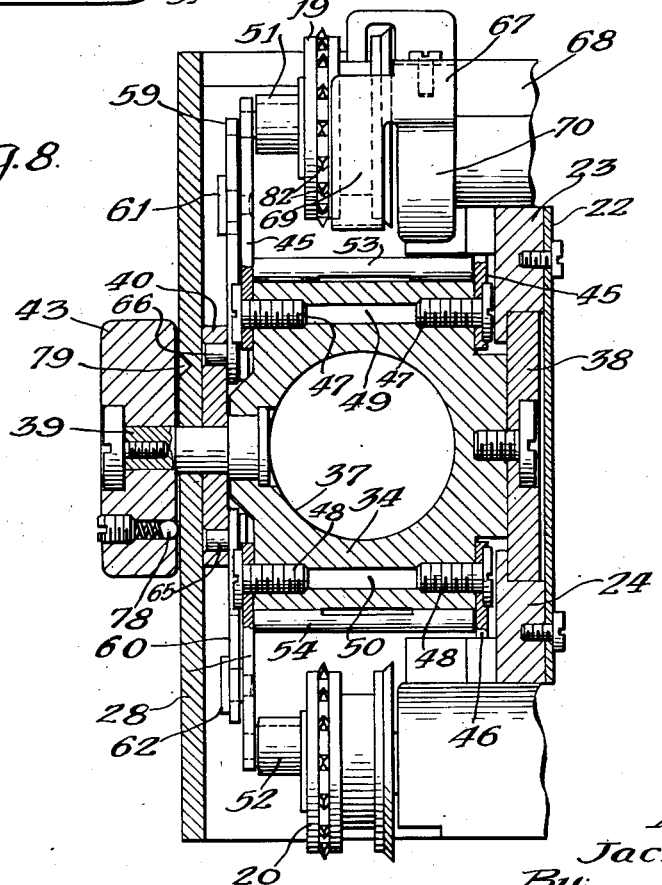

1 and 2, the parts being shown in changed position from one figure to the next;

Fig. 6 is a plan sectional view taken along line 6—6 of Fig. 5;

Fig. 7 is a plan view taken along line 7—7 of Fig. 1;

Fig. 8 is a vertical section taken along lines 8—8 of Fig. 4;

Fig. 9 is a detail view of the plate assembly;

Fig. 10 is a detail view of the sliding member; and

Figure 11:
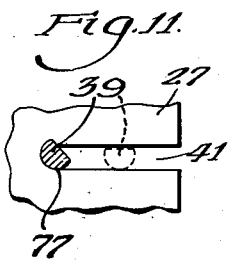
Figure 12:
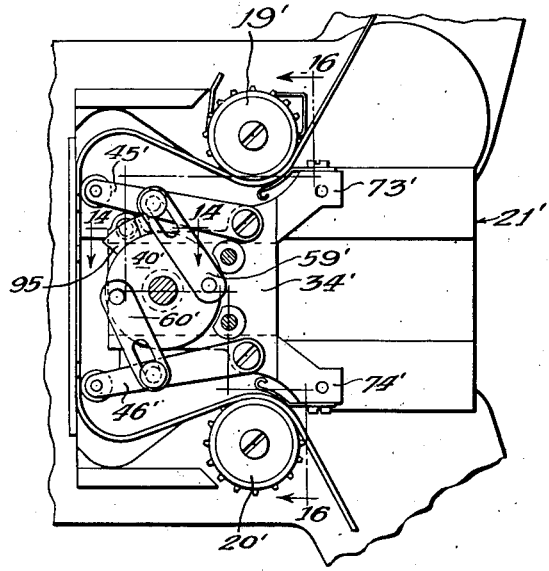
Figure 14:
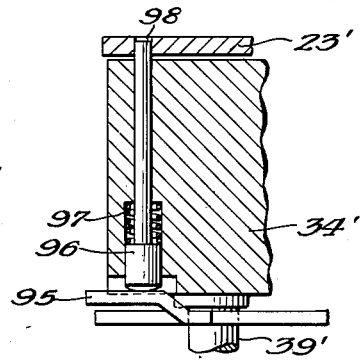
Figure 13:
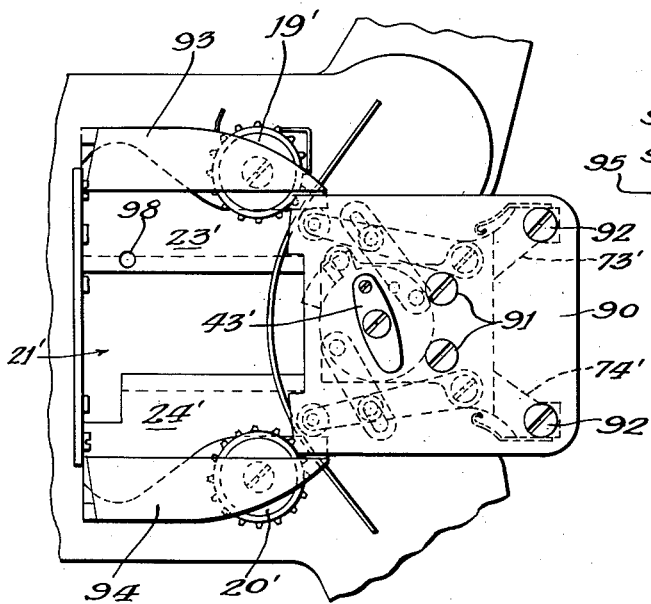
Figure 15:
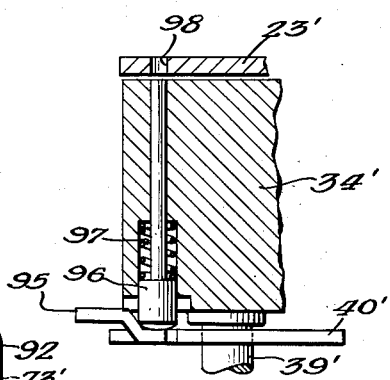
Figure 16:
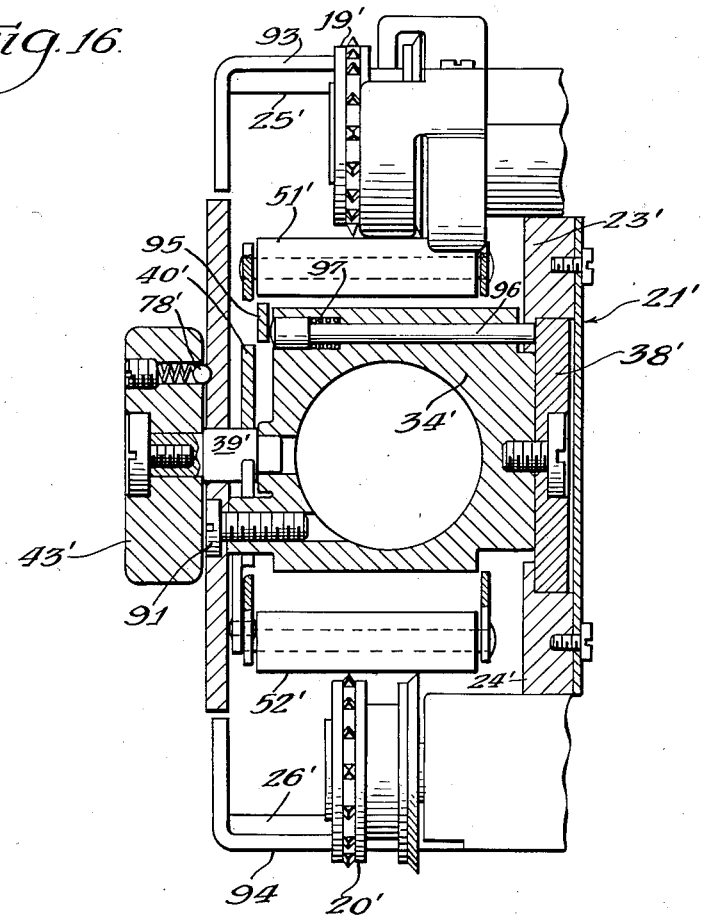

Fig. 11 is a detail view showing the arrangement by means of which certain of the parts may be locked in operative position;

Fig. 12 is a view corresponding to Fig. 5, but showing a modified form of this invention;

Fig. 13 is an elevational view of the modification shown in Fig. 12, the parts being shown in a changed position;

Fig. 14 is a detail section taken along line 14—14 of Fig. 12;

Fig. 15 is a section similar to Fig. 14, but showing the parts in a changed position;

Fig. 16 is a vertical section taken along line 16—16 of Fig. 12; and

Figure 17:
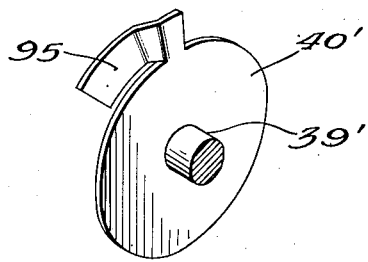

Fig. 17 is a view of the modified form of disk shown in Figs. 12 to 16.

In the drawings, the projector is designated generally by the reference numeral 10, and comprises a base 11, a frame portion 12 mounted on the base, and a lamp housing 13, which may be either formed integrally with or secured to the frame 12. As shown in Figs. 6 and 7, the frame includes an L-shaped portion which provides a forwardly facing vertical surface 14, and a vertical surface 16 which is perpendicular thereto and which faces the observer in Figs. 3 to 5, inclusive. An aperture 15 is formed in the surface 14 and communicates with the lamp housing 13 to provide a path for a light beam which intersects the film. Also mounted on the frame 12 are supply and take-up reels 17 and 18, and supply and take-up sprockets 19 and 20, the latter being mounted on the surface 16 and projecting into the recess formed by the L-shaped portion.

The usual means are provided for driving the reels and sprockets continuously, and the usual means, not shown, are provided for intermittently advancing the film across the aperture 15, just in front of the surface 14.

The film threading means which forms the subject of this invention is disposed in the above mentioned recess formed by the L-shaped portion, and comprises a plate assembly 21 which is shown in Fig. 9. The plate assembly includes a mounting plate 22 to which are secured elongate guides 23 and 24, these elements also being shown in section in Figs. 6 and 8. Also forming a part of the plate assembly are members 25 and 26 which provide horizontally extending portions which cooperate with the remainder of the plate assembly and with a hinged plate 27 to form an enclosure. Positioned forwardly of the hinged plate 27, and in the same plane therewith, is a fixed plate 28 which is suitably mounted on horizontally disposed members 29 and 30, which extend laterally from the surface 16, the latter parts forming, in effect, a continuation of the first mentioned enclosure. A hinge member 31 is secured to a portion of the frame for supporting the hinged plate 27. This hinged arrangement permits access to the parts within the enclosure. As shown in Fig. 1, the plates 27 and 28 are spaced from each other to form a slot 32. Thus, a film which extends from the supply reel 17 to the take-up reel 18, may be laterally inserted through the slot 32 into the enclosure or space between the plates 27 and 28 and the plate assembly 21.

Secured to the surface 14, and apertured to register with the aperture 15, is a smooth plate 33 which cooperates with a sliding member 34 to define a path for the film, which path intersects the light beam passing through the aperture 15.

A sliding member 34 is shown in detail in Figs. 8 and 10, and is adapted to slide from a retracted position in which it clears the slot 32, backwardly into an operative position wherein it is closely spaced from the plate 33. Thus, the film which has been inserted into the slot 32 when the sliding member is in its retracted position, will be engaged by the sliding member as it is slid into its operative position, and will be displaced into its normal position, adjacent the plate 33. Due to the fact that the film is advanced past the aperture 15 with an intermittent motion, whereas it is fed from the supply reel to said film advancing means by the continuously rotating sprocket 19, and due to the fact that it is fed from the film advancing means to the take-up reel by the continuously rotating sprocket 20, the normal path for the film should include loop portions 35 and 36, which are shown in Fig. 5. The sliding member 34, as will be hereinafter pointed out, is provided with retractable loop forming means by means of which the film will be automatically displaced into its normal path as the sliding member is moved into its operative position.

As shown in Figs. 8 and 10, the sliding member is in the form of a block of rectangular cross section. In the particular embodiment of the invention herein shown, in which the film threading means is applied to a projector, in which it is necessary to provide a path for a light beam which passes through and beyond the film, the sliding member 34 also serves as a lens holder, and is provided with a bore 37 in which the usual lens may be disposed. However, this particular arrangement is not necessary where the invention would be applied to a camera, for instance.

Secured to a side surface of the sliding member 34 is a slide plate 38 which is confined between the mounting plate 22 and the undercut guides 23 and 24 of the plate assembly 21. Thus, the sliding member is slidably mounted with respect to the plate assembly. From the opposite side surface of the sliding member projects a rotatable shaft 39 to which is keyed a disk 40. The shaft 39 projects beyond the disk and through a slot 42 formed in fixed plate 28, as shown in Fig. 8. The slot 42 is aligned with a slot 41 formed in hinged plate 27 so as to permit sliding movement of the sliding member 41 from its retracted into its normal position, or vice versa. A knob 43 is secured to the free end of the shaft 39, and provides means which may be grasped by the operator to actuate the sliding member.

The loop forming means comprises a pair of levers 45 which are pivoted on screws 47 taking into a bore 49 passing transversely through the block at the upper portion thereof. A similar pair of levers 46 which are pivoted on screws 48 taking into a bore 50, is provided at the lower portion of the sliding member. The outer ends of each pair of levers are connected by rollers 51 and 52, respectively, and toward the inner ends the levers of each pair are spaced from each other by spacer pins 53 and 54, respectively, as shown in Fig. 6. Leaf springs 55 and 56 are secured to the upper and lower surfaces, respectively, of the sliding member 34, and their free ends bear against the spaced pins 53 and 54, so that the lever pairs 45 and 46 will be urged outwardly, or away from the top and bottom surfaces of the sliding member. The members 25 and 26 are provided with cam portions 57 and 58 respectively, against which the rollers 51 and 52 are biased by the leaf springs 55 and 56. Thus, it will be seen that when the sliding member 34 is in its retracted position, as shown in Fig. 3, the cam portions cause the lever pairs to be contracted, but when the sliding member is shoved into its operative position, as shown in Fig. 4, the lever pairs are expanded to the full extent as permitted by the cam portions. As shown in the said figures, the rollers 51 and 52 engage the film as they are moved outwardly and rearwardly to cause the formation of the loop portions 35 and 36.

Means are provided for collapsing the lever pairs of loop forming portions after the sliding member has been pushed into operative position, thereby leaving the loop portions of the film out of contact with the rollers or any other members which might embody their function. Such means include links 59 and 60 which extend between the respective lever pairs and the disk 40. Link pins 61 and 62, projecting from one lever of each pair, engage slots 63 and 64, respectively, in the links 59 and 60. The other ends of the links are secured to diametrically opposite portions of the disk 40 by link pins 65 and 66, respectively. The lost motion permitted by the slots 63 and 64 permits the lever pairs to assume either contracted or expanded positions when the shaft 39 and disk 40 are in the angular position, as shown in Figs. 3 and 4. By rotating the knob 43 after the parts are in their Fig. 4 position, the lever pairs or loop forming portions are collapsed, as shown in Fig. 5. Thus, the loop portions are automatically formed by grasping the knob, sliding it rearwardly to the limit of its motion, and then turning it in the clockwise direction, as viewed in Figs. 3 to 5.

The formation of the loop portion requires that additional film be drawn from one of the reels, as will be seen from a comparison of Figs. 3 and 5. After the film has been inserted into the slot 32, due to its own resiliency, it will assume a position which is in registry with the sprockets 19 and 20. A film stripper 67 comprises a resilient strip which is mounted on a portion 68 of the frame 12. As shown in Fig. 8, the depending portion of the film stripper is divided into two portions, a portion 69 which overlies the sprocket 19, except for the teeth 82 thereof, and a portion 70 which is bent forwardly, as shown in Figs. 3 to 5, and is adapted to be engaged by a pin 71 positioned in the sliding member. The operation is such that during the last increment of the motion of the sliding member as it is being moved into operative position, the pin 71 will engage the stripper and depress the same, with the result that the portion 69 is displaced forwardly and upwardly so that it assumes a position which lies below the surface defined by the ends of the sprocket teeth 82. The stripping and the depressed positions of portions 69 are shown in Figs. 3 and 5, respectively. It will be noted that the portion 69 is of arcuate shape and overlies substantially 120 degrees of the surface of the sprocket, with the result that when in its stripping position, the film is maintained clear of the teeth 82.

The slide 34 has forwardly extending projections 73 and 74, on which are mounted film retainers 75 and 76, respectively. These film retainers are in the form of leaf springs, each of which is slotted as indicated by the reference numeral 83 in Fig. 6 to clear the sprocket teeth 82. As the sliding member 34 is moved into operative position, the film retainers engage the film and in the event that the film apertures 80 are in registry with the sprocket teeth 82, the film retainers will move the film against the surface of the sprocket wheel so that the teeth will engage in the film apertures. This occurs at the same time that the film stripper is being depressed. In the event that the film apertures are not in registry with the sprocket teeth, the resiliency of the film retainers permits the film to ride on the sprocket teeth until such time as rotation of the sprocket will bring the teeth into registry and permit engagement of the film apertures by the teeth.

It will be noted that a film retainer is provided for each film sprocket, but only one film stripper is required, since the necessary film can come either from the supply reel or the take-up reel.

Means are provided to lock the sliding member 34 in its operative position, and at the same time lock the loop forming portion in collapsed position. Such means comprises an enlarged portion 77 of the slot 41, which enlarged portion is located at the rear end of the slot, as shown in Fig. 11. The shaft 39, as shown in Figs. 3 to 5 and 11, is slabbed, and the major portions of slots 40 and 41 are of a width to accommodate the shaft only when its slabbed portion is parallel to the direction of the slot. However, when the sliding member is in its operative position, the enlarged portion 77 permits the knob and shaft to be rotated in order to collapse the loop forming portions, as pointed out above. When rotated into the Fig. 5 position, a ball detent 78, provided in the knob 43, as shown in Fig. 8, is rotated into registry with and drops into the recess 79 formed in the hinged plate 27. Thus, the knob is maintained in the angular position shown in Figs. 1 and 5, and in this angular position, it is prevented from moving forwardly into the narrow portion of slot 41. Thus, the sliding member 34 and the loop forming portions are locked in the Fig. 5 position.

The operation of the various parts has been described in detail in connection with the description of the several portions thereof. In summary, after the supply reel 17 is placed on the projector, and the free end thereof inserted into the slot 32, and secured to the take-up reel, the knob 43 is moved backwardly to the limit of its position, and then rotated in the clockwise direction until the ball detent 78 snaps into place. Thus the film is brought up against the plate 33, and the loop portions 35 and 36 are automatically formed. The action of the film stripper 67 permits the necessary amount of film to be drawn from the supply reel as the sliding member moves into operative position and as the loop forming portions expand. The film retainers maintain the film against the sprocket teeth until such time as the sprocket teeth are rotated into registry with the film apertures. If desired, the usual pressure plate may be resiliently mounted at the rear end of the sliding member 34 to maintain the film securely against the plate 33. In the alternative, resilient members 84, mounted on the rearwardly facing surface of the sliding member 34, may engage suitable lugs or projections 85 extending forwardly from the plate 33. The parts are so arranged, as shown in Fig. 6, that the film is confined against the plate 33 only by contact of the resilient members 84 at a point near the edges of the film. Thus, the film is effectively confined in its proper plane without the use of a pressure plate which would bear against the entire film area. According to either form of construction, it will be observed that by causing the sliding member 34 to be used as a lens holder, the first element of the projection lens can be spaced much closer to the film than in the usual construction wherein the lens is fixed, and has to be spaced far enough from the film to permit the opening of the usual film gate. The arrangement herein shown permits the use of a shorter focal length lens, as pointed out above.

After the film from the supply reel has been exhausted, the knob 43 can be rotated sufficiently to permit the knob to be moved forwardly, thereby attracting the sliding member to the Fig. 3 position, at which time another film can be threaded.

The film stripper 67, instead of being formed from a resilient strip, can be in the form of a slidably mounted member embodying an overlying portion similar to portion 69. In such an event, the slidably mounted member would be biased forwardly and downwardly and would be engaged by the sliding member 34 as the latter is moved into operative position in order to displace the film stripper out of stripping position.

A modified form of this invention is shown in Figs. 12 to 17, inclusive, and in which the parts which correspond to the parts shown in Figs. 1 to 11, inclusive, are designated by the same reference numerals primed.

The main difference in the modification is that instead of providing plates 27 and 28 which are mounted on the projector, and which serve to protect the operating parts, a plate 90 is provided which is mounted on the sliding member 34' by means of screws 91 which take into the main portion of sliding member 34' and by means of screws 92 which take into the projecting arms 73' and 74' of sliding member 34'. Thus, the sliding member and cover plate is an integral unit which slides between the retracted position shown in Fig. 13 and the operative position as shown in Fig. 12. The horizontally extending members 25' and 26' are provided with downwardly bent flanges 93 and 94 which terminate just short of the top and bottom edges respectively of the plate 90. Thus the parts are completely enclosed by the cooperation of members 90, 93 and 94 when the sliding member is in operative position, and the latter is completely supported by the cooperation of the sliding plate 38' and the elongate guides of the plate assembly 21'.

A ball detent 78' is provided to maintain the knob 43' and its associated parts in collapsed position. However, since no portion of the knob 43' or shaft 39' cooperates with any stationary part of the projector, additional means are provided to lock the sliding member 34' in its operative position. Such means are shown in Figs. 14 to 17, inclusive, and include a plunger 96 which is horizontally mounted in the sliding member 34', and biased outwardly by means of a spring 97. The reduced end portion of the plunger 96 is adapted to project into the aperture 98 formed in a portion of the elongate guide 23'. The locations of the plunger 96 and the aperture 98 are such that they will be in registry when the sliding member is in its operative position. The plunger is depressed into its locking position by means of a cam portion 95 on the disk 40', as shown in Figs. 14 and 17. Thus, after the sliding member has been moved into its operative position, and the levers 45' and 46' have been collapsed by rotating the knob 43', the movement of the latter into lever collapsing position causes the plunger to be depressed, thereby locking the sliding member in its operative position. The ball detent 78' maintains a disk 40' and the cam portion 95 in such locking position.

In other respects, the operation of the modified form of this invention is the same as the operation of the embodiment shown in Figs. 1 to 11, inclusive.

It will be understood that various modifications and changes may be made in the constructions herein shown, which illustrate only preferred embodiments of this invention. The invention is defined only in the appended claims.

I claim:

1. In a motion picture apparatus having intermittent film advancing means, a film supply sprocket and a film take-up sprocket, said sprockets being disposed substantially one over the other and said intermittent film advancing means being disposed at a point between said sprockets and rearwardly thereof to provide a film path including two loop portions, the combination of a sliding member adapted, when in inoperative position, to engage a film when said film is disposed substantially vertically in front of said sprockets and adapted, when in operative position, to maintain said film rearwardly in engagement with said intermittent film advancing means, extensible means mounted on said sliding member for movement in a direction substantially transverse to the movement of said sliding member to cause said film to be disposed in said loop portions, said extensible means being retractible, and means to maintain said film out of engagement with at least one of said film feeding means until said sliding means is disposed in normal film positioning position.

2. In a motion picture apparatus having intermittent film advancing means, a film supply sprocket and a film take-up sprocket, said sprockets being disposed substantially one over the other and said intermittent film advancing means being disposed at a point between said sprockets and rearwardly thereof to provide a film path including two loop portions, the combination of a sliding member adapted, when in inoperative position, to engage a film when said film is disposed substantially vertically in front of said sprockets and adapted, when in operative position, to maintain said film rearwardly in engagement with said intermittent film advancing means, said sliding member having a loop forming portion pivotally mounted thereon, and means to move said loop forming portion toward and away from said sliding means in a direction substantially transverse to the movement of said sliding member so that the same may be extended into the space between said sprocket and said intermittent film advancing means to engage said film and form a loop portion.

3. Self threading means for motion picture apparatus which embodies intermittent film advancing means, a film supply sprocket and a film take-up sprocket, said sprockets being disposed substantially one over the other and said film advancing means being disposed at a point substantially equidistant from said sprockets and rearwardly thereof, the combination of a sliding member adapted, when in inoperative position, to engage a film when said film is disposed substantially vertically in front of said sprockets and adapted, when in operative position, to maintain said film rearwardly in engagement with said intermittent film advancing means, pivoted means extending from the upper and lower surfaces of said sliding member and adapted to be expanded as said sliding member is moved from inoperative position into operative position, in order that said pivoted means may engage the film as it is being displaced to form upper and lower loop portions, and means for retracting said pivoted means.

4. Self threading means as claimed in claim 3 in which common means are provided for locking said sliding member in operative position and said pivoted means in retracted position.

5. Self threading means as claimed in claim 3 in which said retracting means includes a rotatable slabbed shaft journaled in said sliding member, a slotted plate positioned adjacent said sliding member through which said slabbed shaft extends, the width of said slot being sufficiently small to prevent angular displacement of said slabbed shaft as said sliding member is moved from inoperative into operative position, a knob fixed to said shaft exteriorly of said plate, said slot terminating in an enlarged portion to permit angular displacement of said knob and said slabbed shaft after said sliding member has been moved into operative position whereby said pivoted means are maintained in retracted position and whereby said slabbed shaft cooperates with the enlarged portion of said slot to prevent displacement of said sliding member out of operative position.

6. Self threading means as claimed in claim 3 in which said sliding member is provided on its upper and lower surfaces with resilient film retainers which serve to urge the film against said film sprockets when said sliding means is moved into operative position whereby said film will be displaced into driven engagement with said sprockets when the teeth of said sprockets have been rotated into registry with the apertures of said film.

7. Self threading means as claimed in claim 3 having film stripper means for maintaining said film out of engagement with one of said sprockets while said sliding member is moved from inoperative into operative position, and having resilient film retaining means for maintaining said film in engagement with said sprockets after said sliding member is in operative position.

8. Self threading means for motion picture apparatus as claimed in claim 3, and having a pair of cam surfaces adapted to control the position of said pivoted means, and having means biasing said pivoted means against said cam surfaces, whereby said pivoted portions are automatically expanded as said slide member is moved into operative position.

9. Self threading means for motion picture apparatus which embodies intermittent film advancing means, a film supply sprocket and a film take-up sprocket, said sprockets being disposed substantially one above the other and said film advancing means being disposed at a point substantially equidistant from said sprockets and rearwardly thereof, the combination of a sliding member having a film engaging portion and adapted to be moved from an inoperative position in which said film engaging portion is disposed forwardly of a film disposed substantially vertically in front of said sprockets into an operative position in which said film engaging portion maintains said film in engagement with said intermittent film advancing means, means mounted on said motion picture apparatus for guiding the movement of said sliding member, pivoted means extending from the upper and lower surfaces of said sliding member and adapted to be expanded as said sliding member is moved from inoperative to operative position in order that said pivoted means may engage the film as it is being displaced to form upper and lower loop portions, means for retracting said pivoted means and for maintaining said pivoted means in retracted position after said sliding member has been moved into operative position, and film stripper means overlying one of said sprockets for maintaining said film out of engagement therewith while said sliding member is moved from inoperative into operative position, and having a portion adapted to be engaged by said sliding member to permit engagement of said film by said sprocket when said sliding member is in operative position.

10. A motion picture projector comprising a pair of continuously rotating film sprockets disposed parallel to each other and aligned with each other, an apertured plate disposed substantially parallel to a line connecting said film sprockets, and disposed rearwardly thereof, means to project a beam of light through the aperture of said plate and between said sprockets, means for advancing a film intermittently across the surface of said apertured plate, a member adapted to be displaced from an inoperative position in which it is disposed forwardly of said line connecting said film sprockets into an operative position in which it cooperates with said apertured plate to confine said film movement in a path across the surface of said apertured plate, said displaceable member being apertured to form a path for said light beam, and a lens disposed in said apertured displaceable member whereby a film disposed between said sprockets will be engaged by said displaceable member as said member is moved into operative position and positioned in said film path.

11. A motion picture projector comprising a pair of continuously rotating film sprockets disposed parallel to each other and aligned with each other, an apertured plate disposed substantially parallel to a line connecting said film sprockets, and disposed rearwardly thereof, means to project a beam of light through the aperture of said film plate and between said sprockets, means for advancing a film intermittently across the surface of said apertured plate, a member adapted to be displaced from an inoperative position in which it is disposed forwardly of said line connecting said film sprockets into an operative position in which it cooperates with said apertured plate to confine said film movement in a path across the surface of said apertured plate, said displaceable member being apertured to form a path for said light beam, a lens disposed in said apertured displaceable member whereby a film disposed between said sprockets will be engaged by said displaceable member as said member is moved into operative position and positioned in said film path, and film stripper means overlying one of said sprockets for maintaining said film out of engagement therewith while said displaceable member is moved from inoperative into operative position, and having a portion adapted to be engaged by said displaceable member to permit engagement of said film by said sprocket when said displaceable member is in operative position.

JACK BRISKIN.

REFERENCES CITED

The following references are of record in the file of this patent:

UNITED STATES PATENTS

| Number | Name | Date |
| --- | --- | --- |
| 1,637,378 | Howell | Aug. 2, 1927 |
| 1,865,107 | Howell | June 28, 1932 |
| 1,973,477 | Fritts | Sept. 11, 1934 |
| 2,000,286 | Howell | May 7, 1935 |
| 2,051,036 | Foster et al. | Aug. 18, 1936 |
| 2,051,787 | Foster | Aug. 18, 1936 |
| 2,172,235 | Aldinger | Sept. 5, 1939 |

FOREIGN PATENTS

| Number | Country | Date |
| --- | --- | --- |
| 401,977 | Great Britain | Nov. 23, 1933 |